(12) United States Patent
Yamazaki

(10) Patent No.: US 11,679,562 B2
(45) Date of Patent: Jun. 20, 2023

(54) METHOD FOR MANUFACTURING THREE-DIMENSIONAL SHAPED OBJECT AND THREE-DIMENSIONAL SHAPING DEVICE

(71) Applicant: Seiko Epson Corporation, Tokyo (JP)

(72) Inventor: Shigeru Yamazaki, Shiojiri (JP)

(73) Assignee: SEIKO EPSON CORPORATION

( * ) Notice: Subject to any disclaimer, the term of this patent is extended or adjusted under 35 U.S.C. 154(b) by 184 days.

(21) Appl. No.: 16/931,504

(22) Filed: Jul. 17, 2020

(65) Prior Publication Data
US 2021/0016511 A1  Jan. 21, 2021

(30) Foreign Application Priority Data
Jul. 19, 2019 (JP) .............................. JP2019-133214

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC .................... B29C 64/386–393; B29C 64/118
See application file for complete search history.

(56) References Cited

U.S. PATENT DOCUMENTS 6,823,230 B1 * 11/2004 Jamalabad ......... G05B 19/4099
  700/182
8,349,239 B2 * 1/2013 Hopkins ............... B29C 64/118
  264/308
(Continued)

FOREIGN PATENT DOCUMENTS

CN      108327251 A    7/2018
JP      2009-525207 A  7/2009
(Continued)

OTHER PUBLICATIONS

Livesu, Marco & Ellero, Stefano & Martinez, Jonas & Lefebvre, Sylvain & Attene, Marco., From 3D Models to 3D Prints: an Overview of the Processing Pipeline. Computer Graphics Forum. 36., May 2017 (Accessed Jul. 6, 2022) https://www.researchgate.net/figure/Four-different-filling-patterns (Year: 2017).*

(Continued)

*Primary Examiner* — Matthew J Daniels
*Assistant Examiner* — Andrew L Swanson
(74) *Attorney, Agent, or Firm* — Harness, Dickey & Pierce, P.L.C.

(57) ABSTRACT

To provide a method for manufacturing a three-dimensional shaped object in which a three-dimensional shaped object is manufactured by discharging a shaping material from a discharge unit. The method for manufacturing a three-dimensional shaped object includes: (A) a step of generating first shaping data including information on a first discharge path for forming an outer shell shape of the three-dimensional shaped object, and information for specifying a line width of the first discharge path; (B) a step of generating second shaping data including information on a second discharge path for filling an infill area that is an inner side portion of the outer shell shape, and information for specifying a line width of the second discharge path; and (C) a step of shaping the three-dimensional shaped object accord- (Continued)

ing to the first shaping data and the second shaping data. In step (B), a path indicating a plurality of polygons whose sizes change in a stepwise manner from a shape along an outermost circumference of the infill area to a shape of a central area of the infill area is generated as the second discharge path.

4 Claims, 8 Drawing Sheets

(51) Int. Cl.
    *B33Y 30/00*         (2015.01)
    *B33Y 10/00*         (2015.01)
    *B33Y 50/02*         (2015.01)
    *B29C 64/118*      (2017.01)

(52) U.S. Cl.
    CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,821,633 B1* | 11/2020 | Quinonez | B29C 41/12 |
| 2007/0179657 A1 | 8/2007 | Holzwarth | |
| 2014/0048969 A1* | 2/2014 | Swanson | B29C 64/209 |
| | | | 264/129 |
| 2015/0165691 A1* | 6/2015 | Mark | B29C 64/393 |
| | | | 700/98 |
| 2016/0263832 A1* | 9/2016 | Bui | B33Y 50/00 |
| 2017/0015057 A1* | 1/2017 | Stevens | B29C 64/386 |
| 2017/0176976 A1* | 6/2017 | Burton | B33Y 10/00 |
| 2017/0259508 A1* | 9/2017 | Lee | B29C 64/393 |
| 2017/0266884 A1 | 9/2017 | Maeda | |
| 2018/0264742 A1 | 9/2018 | Yang et al. | |
| 2018/0264751 A1* | 9/2018 | Tran | B29C 64/386 |
| 2018/0326669 A1* | 11/2018 | Chen | B29C 67/00 |
| 2019/0210106 A1* | 7/2019 | Gibson | B22F 10/20 |
| 2019/0351620 A1* | 11/2019 | Jaiswal | G06F 30/20 |

FOREIGN PATENT DOCUMENTS

| | | |
|---|---|---|
| JP | 2017-109320 A | 6/2017 |
| JP | 2017-165041 A | 9/2017 |
| JP | 2018-176573 A | 11/2018 |
| JP | 2018-176597 A | 11/2018 |
| JP | 2019-025761 A | 2/2019 |
| WO | 2017-094791 A1 | 6/2017 |

OTHER PUBLICATIONS

Haisen Zhao, Fanglin Gu, Qi-Xing Huang, Jorge Garcia, Yong Chen, Changhe Tu, Bedrich Benes, Hao Zhang, Daniel Cohen-Or, and Baoquan Chen. 2016. Connected fermat spirals for layered fabrication. ACM Trans. Graph. 35, 4, Article 100, Jul. 2016 (Accessed Jul. 6, 2022), https://doi.org/10.1145/2897 (Year: 2016).*

* cited by examiner

METHOD FOR MANUFACTURING THREE-DIMENSIONAL SHAPED OBJECT AND THREE-DIMENSIONAL SHAPING DEVICE

The present application is based on, and claims priority from JP Application Serial Number 2019-133214, filed Jul. 19, 2019, the disclosure of which is hereby incorporated by reference herein in its entirety.

BACKGROUND

1. Technical Field

The present disclosure relates to a method for manufacturing a three-dimensional shaped object and a three-dimensional shaping device.

2. Related Art

Regarding a method for manufacturing a three-dimensional shaped object, for example, JP-T-2009-525207 discloses moving a nozzle for extruding a shaping material according to a build path for building each layer of a three-dimensional shaped object. The build path includes a peripheral path and a bulk cluster path disposed within the peripheral path.

In JP-T-2009-525207, an area that cannot be filled with the bulk cluster path is specified as a void area, and an additional residual path is generated in the void area, thereby preventing generation of a gap. However, it is desired to generate one entire path so that the void area where the residual path is to be generated is not generated in the first place.

SUMMARY

According to a first aspect of the present disclosure, a method for manufacturing a three-dimensional shaped object in which a three-dimensional shaped object is manufactured by discharging a shaping material from a discharge unit is provided. The method for manufacturing a three-dimensional shaped object includes: (A) a step of generating first shaping data including information on a first discharge path for forming an outer shell shape of the three-dimensional shaped object, and information for specifying a line width of the first discharge path; (B) a step of generating second shaping data including information on a second discharge path for filling an infill area that is an inner side portion of the outer shell shape, and information for specifying a line width of the second discharge path; and (C) a step of shaping the three-dimensional shaped object according to the first shaping data and the second shaping data, in which in step (B), a path indicating a plurality of polygons whose sizes change in a stepwise manner from a shape along an outermost circumference of the infill area to a shape of a central area of the infill area is generated as the second discharge path.

DESCRIPTION OF EXEMPLARY EMBODIMENTS

A. First Embodiment

Figure 1:
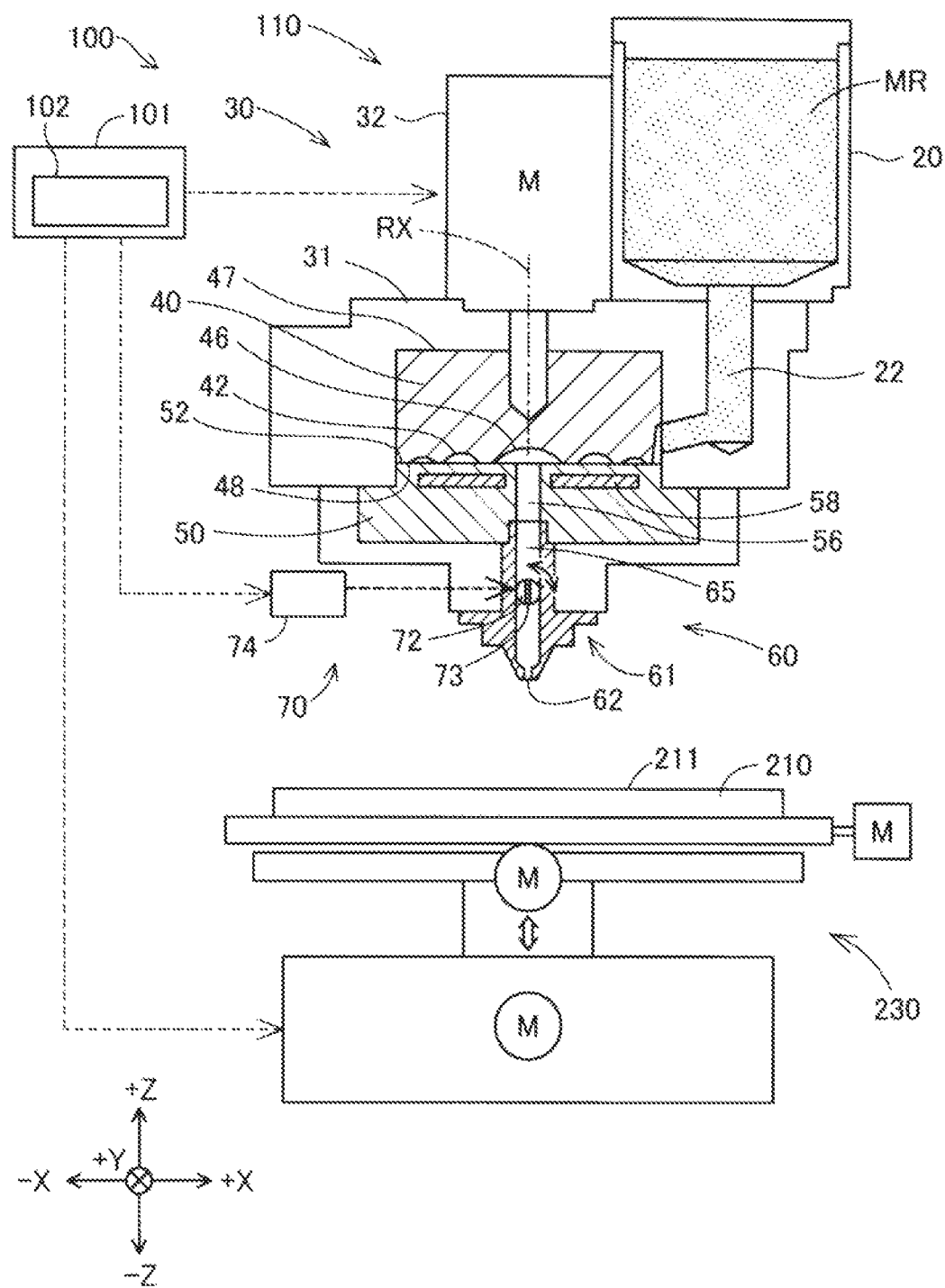
FIG. 1 is a diagram showing a schematic configuration of a three-dimensional shaping device according to a first embodiment.

FIG. 1 is a diagram showing a schematic configuration of a three-dimensional shaping device 100 according to the first embodiment. FIG. 1 shows arrows indicating X, Y, and Z directions that are orthogonal to one another. The X direction and the Y direction are parallel to a horizontal plane, and the Z direction is opposite to a gravity direction. The arrows indicating the X, Y, and Z directions are appropriately shown in other figures so that the shown directions correspond to FIG. 1. In the following description, when a direction is specified, indicates a positive direction and "-" indicates a negative direction, and positive and negative symbols are used together to indicate directions.

The three-dimensional shaping device 100 includes a control unit 101 that controls the three-dimensional shaping device 100, a shaping unit 110 that generates and discharges a shaping material, a stage 210 for shaping that serves as a base of a three-dimensional shaped object, and a moving mechanism 230 that controls a discharge position of the shaping material.

Under the control of the control unit 101, the shaping unit 110 melts a material in a solid state and discharges the shaping material in a paste form onto the stage 210. The shaping unit 110 includes a material supply unit 20 that is a supply source of a material before being converted into a shaping material, a shaping material generation unit 30 that converts the material into the shaping material, and a discharge unit 60 that discharges the shaping material.

The material supply unit 20 supplies a raw material MR used for generating a shaping material to the shaping material generation unit 30. The material supply unit 20 is implemented by, for example, a hopper that accommodates the raw material MR. The material supply unit 20 includes a discharge port at a lower side. The discharge port is coupled to the shaping material generation unit 30 via a communication path 22. The raw material MR is charged to the material supply unit 20 in a form of pellet, powder, or the like. An ABS resin material in a pellet form is used in the present embodiment.

The shaping material generation unit 30 generates a paste-formed shaping material that exhibits flowability by melting the raw material MR supplied from the material supply unit 20, and guides the shaping material to the discharge unit 60. The shaping material generation unit 30 includes a screw case 31, a drive motor 32, a flat screw 40, and a screw facing portion 50.

Figure 2:
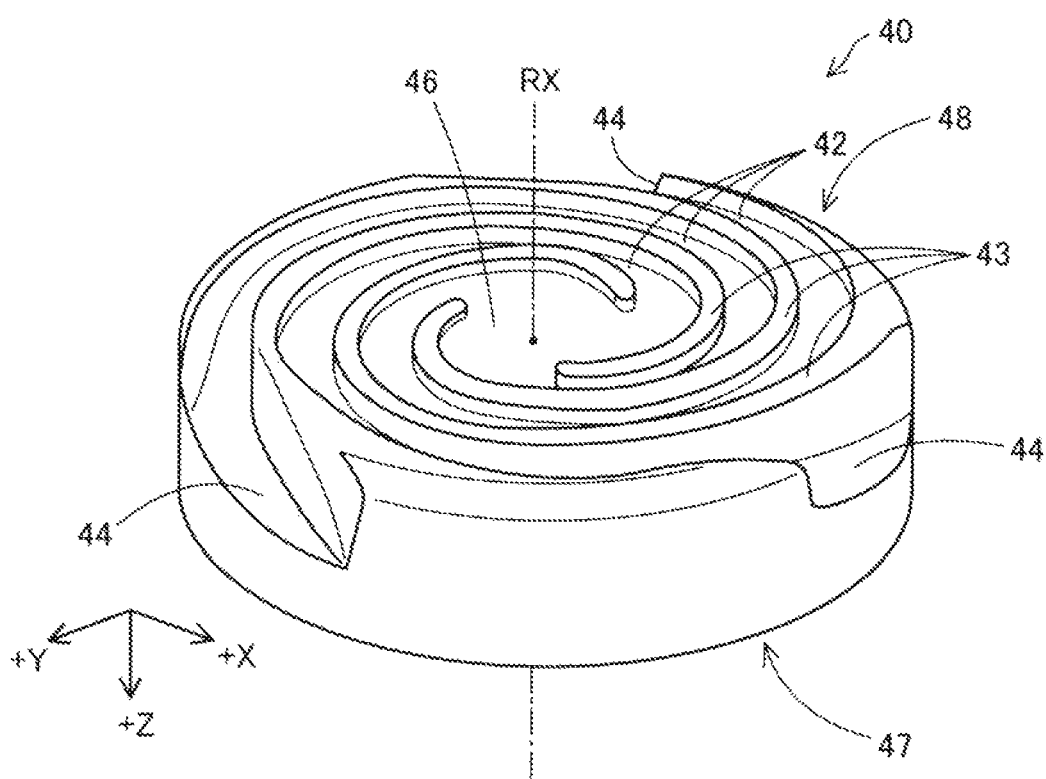
FIG. 2 is a perspective view showing a schematic configuration of a flat screw on a lower surface side.
Figure 3:
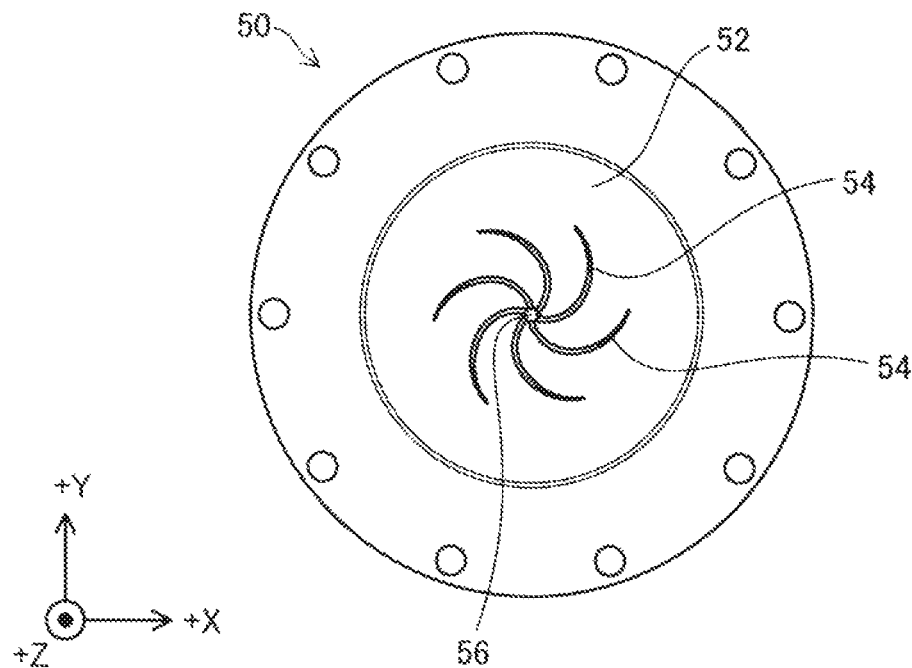
FIG. 3 is a schematic plan view showing a screw facing portion on an upper surface side.

FIG. 2 is a perspective view showing a schematic configuration of the flat screw 40 on a lower surface 48 side. In order to facilitate understanding of the technique, the flat screw 40 shown in FIG. 2 is shown in a state where a positional relationship between an upper surface 47 and a lower surface 48 shown in FIG. 1 is reversed in a vertical direction. FIG. 3 is a schematic plan view showing the screw facing portion 50 on an upper surface 52 side. The flat screw 40 has a substantially columnar shape whose height in an axial direction which is a direction along a central axis of the flat screw 40 is smaller than a diameter. The flat screw 40 is disposed in a manner that a rotation axis RX that serves as a rotation center of the flat screw 40 is parallel to the Z direction.

The flat screw 40 is accommodated in the screw case 31. An upper surface 47 side of the flat screw 40 is coupled to the drive motor 32, and the flat screw 40 is rotated within the screw case 31 by a rotation drive force generated by the drive motor 32. The drive motor 32 drives under the control of the control unit 101.

A groove portion 42 is formed on the lower surface 48 that is a surface of the flat screw 40 that intersects the rotation axis RX. The communication path 22 of the material supply unit 20 above communicates with the groove portion 42 from a side surface of the flat screw 40. In the present embodiment, three groove portions 42 are formed by being separated by ridge portions 43 as shown in FIG. 2. The number of the groove portions 42 is not limited to three, and may be one, or two or more.

The lower surface 48 of the flat screw 40 faces an upper surface 52 of the screw facing portion 50, and a space is formed between the groove portions 42 on the lower surface 48 of the flat screw 40 and the upper surface 52 of the screw facing portion 50. In the shaping unit 110, the raw material MR is supplied from the material supply unit 20 to a material inflow port 44 shown in FIG. 2 in the space between the flat screw 40 and the screw facing portion 50.

A heater 58 for heating the raw material MR supplied into the groove portion 42 of the flat screw 40 in rotation is embedded in the screw facing portion 50. A plurality of guide grooves 54 that are coupled to a communication hole 56 and extend spirally from the communication hole 56 towards an outer circumference are formed on the screw facing surface 52. The raw material MR supplied into the groove portion 42 of the flat screw 40 flows along the groove portion 42 by rotation of the flat screw 40 while being melted in the groove portion 42, and the raw material MR is guided to a central portion 46 of the flat screw 40 as the shaping material. The paste-formed shaping material that flows into the central portion 46 and exhibits flowability is supplied to the discharge unit 60 via the communication hole 56 provided at a center of the screw facing portion 50 shown in FIG. 3. In the shaping material, not all types of substances that constitute the shaping material may be melted. The shaping material may be converted into a state where the shaping material has flowability as a whole by melting at least a part of substances that constitute the shaping material.

The discharge unit 60 includes a nozzle 61 that discharges the shaping material, a flow path 65 for the shaping material that is provided between the flat screw 40 and the nozzle 61, and an opening and closing mechanism 70 that opens or closes the flow path 65. The nozzle 61 is coupled to the communication hole 56 of the screw facing portion 50 through the flow path 65. The nozzle 61 discharges the shaping material generated in the shaping material generation unit 30 from a discharge port 62 at a tip end of the nozzle 61 towards the stage 210.

The opening and closing mechanism 70 opens or closes the flow path 65 to control the shaping material flowing out from the nozzle 61. In the first embodiment, the opening and closing mechanism 70 is implemented by a butterfly valve. The opening and closing mechanism 70 includes a drive shaft 72 that is a shaft-shaped member extending in one direction, a valve body 73 that is rotated by rotation of the drive shaft 72, and a valve drive unit 74 that generates a rotation drive force of the drive shaft 72.

The drive shaft 72 is mounted in a middle of the flow path 65 so as to intersect a flow direction of the shaping material. More specifically, the drive shaft 72 is mounted parallel to the Y direction which is a direction perpendicular to a flow direction of the shaping material in the flow path 65. The drive shaft 72 is rotatable around a central axis along the Y direction.

The valve body 73 is a plate-shaped member that is rotated in the flow path 65. In the first embodiment, the valve body 73 is formed by processing a portion of the drive shaft 72 that is disposed in the flow path 65 into a plate shape. A shape of the valve body 73 as viewed in a direction perpendicular to a plate surface of the valve body 73 substantially coincides with an opening shape of the flow path 65 at a portion where the valve body 73 is disposed.

The valve drive unit 74 rotates the drive shaft 72 under the control of the control unit 101. The valve drive unit 74 is implemented by, for example, a stepping motor. The valve body 73 is rotated in the flow path 65 by rotation of the drive shaft 72.

A state where the plate surface of the valve body 73 is perpendicular to the flow direction of the shaping material in the flow path 65 is a state where the flow path 65 is closed. In this state, the shaping material is blocked from flowing from the flow path 65 into the nozzle 61, and the shaping material is stopped flowing out from the discharge port 62. When the plate surface of the valve body 73 is rotated from the perpendicular state by the rotation of the drive shaft 72, the shaping material is allowed to flow from the flow path 65 to the nozzle 61, and the shaping material of a discharge amount corresponding to a rotation angle of the valve body 73 flows out from the discharge port 62. A state where the flow direction of the shaping material in the flow path 65 is as shown in FIG. 1 is a state where the flow path 65 is fully opened. In this state, the discharge amount of the shaping material from the discharge port 62 per unit time is the maximum. Thus, the opening and closing mechanism 70 can adjust the discharge amount of the shaping material along with ON and OFF of the outflow of the shaping material.

The stage 210 is disposed at a position facing the discharge port 62 of the nozzle 61. In the first embodiment, a surface 211 of the stage 210 that faces the discharge port 62 of the nozzle 61 is parallel to the X and Y directions, that is, horizontal directions. In a shaping processing, the three-dimensional shaping device 100 shapes a three-dimensional shaped object by discharging the shaping material from the discharge unit 60 towards the surface 211 of the stage 210 and stacking layers, which will be described later.

The moving mechanism 230 changes a relative position between the stage 210 and the nozzle 61. In the first embodiment, a position of the nozzle 61 is fixed, and the moving mechanism 230 moves the stage 210. The moving mechanism 230 includes a three-axis positioner that moves the stage 210 in three axial directions in the X, Y, and Z directions by drive forces of three motors M. The moving mechanism 230 changes a relative positional relationship between the nozzle 61 and the stage 210 under the control of the control unit 101. In the description, a movement of the nozzle 61 means moving the nozzle 61 relative to the stage 210, unless otherwise specified.

Other than a configuration in which the moving mechanism 230 moves the stage 210, other embodiments may adopt a configuration in which a position of the stage 210 is in a fixed state and the moving mechanism 230 moves the nozzle 61 relative to the stage 210. Other embodiments may also adopt a configuration in which the moving mechanism 230 moves the stage 210 in the Z direction and moves the nozzle 61 in the X and Y directions, or a configuration in which the moving mechanism 230 moves the stage 210 in the X and Y directions and moves the nozzle 61 in the Z direction. The relative positional relationship between the nozzle 61 and the stage 210 can also be changed in these configurations.

The control unit 101 is a control device that controls an overall operation of the three-dimensional shaping device 100. The control unit 101 is implemented by a computer including one or a plurality of processors, a main storage device, and an input and output interface that inputs a signal from the outside or outputs a signal to the outside. In addition to a function of serving as a data generation unit 102, the control unit 101 has various functions by the processor executing a program or an instruction read on the main storage device. Instead of being implemented by a computer, the control unit 101 may be implemented by a configuration in which a plurality of circuits is combined in order to implement at least a part of the functions.

The data generation unit 102 generates shaping data for moving the discharge unit 60 by the moving mechanism 230. The control unit 101 controls the moving mechanism 230 and the shaping unit 110 that includes the opening and closing mechanism 70 and the discharge unit 60 according to the shaping data generated by the data generation unit 102 to shape a three-dimensional shaped object on the stage 210.

The data generation unit 102 generates the shaping data by using shape data such as three-dimensional CAD data that indicates a shape of the three-dimensional shaped object. The shaping data includes first shaping data and second shaping data. The first shaping data includes information on a first discharge path forming an outer shell shape of the three-dimensional shaped object, and information for specifying a line width of the first discharge path. The second shaping data includes information on a second discharge path that fills an infill area that is an inner side portion of the outer shell shape of the three-dimensional shaped object, and information for specifying a line width of the second discharge path. The line width is a thickness of the shaping material discharged onto the stage 210.

In the present embodiment, the information for specifying the line width of each discharge path is information indicating at least one of a moving speed of the discharge unit 60 and the discharge amount of the shaping material. If the moving speed of the discharge unit 60 is decreased while the discharge amount of the shaping material is constant, the line width becomes thicker, and if the moving speed is increased, the line width becomes thinner. If the discharge amount per unit area of the shaping material is increased while the moving speed of the discharge unit 60 is constant, the line width becomes thicker, and if the discharge amount is decreased, the line width becomes thinner. The discharge amount of the shaping material may be expressed as the discharge amount per unit area, or the discharge amount may be expressed as an absolute amount for each path corresponding to one side of a polygon constituting the discharge path.

Figure 4:
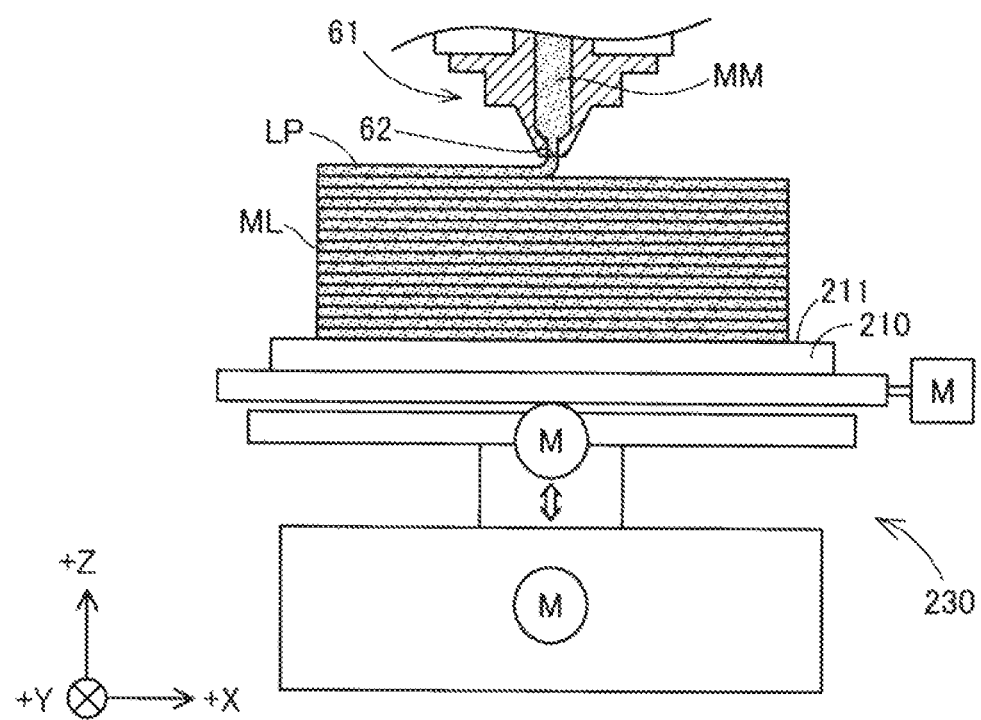
FIG. 4 is a schematic diagram schematically showing a state where a three-dimensional shaped object is shaped.

FIG. 4 is a schematic diagram schematically showing a state where a three-dimensional shaped object is shaped in the three-dimensional shaping device 100. In the three-dimensional shaping device 100, as described above, the raw material MR in a solid state that is supplied to the groove portion 42 of the flat screw 40 in rotation is melted to generate a shaping material MM in the shaping material generation unit 30. The control unit 101 maintains a distance between the surface 211 of the stage 210 and the nozzle 61, and discharges the shaping material MM from the nozzle 61 while changing a position of the nozzle 61 relative to the stage 210 in a direction along the surface 211 of the stage 210. The shaping material MM discharged from the nozzle 61 is continuously stacked in a moving direction of the nozzle 61. A linear portion LP that is a shaping portion extending linearly along a scanning path of the nozzle 61 is shaped by scanning with the nozzle 61.

The control unit 101 repeats the scanning with the nozzle 61 to form layers ML. After forming one layer ML, the control unit 101 moves the position of the nozzle 61 relative to the stage 210 in the Z direction. Then, a three-dimensional shaped object is formed by further stacking a layer ML on the layers ML that are formed so far.

For example, the control unit 101 may temporarily pause the discharge of the shaping material from the nozzle 61 when the nozzle 61 is moved in the Z direction after stack of the layer ML for one layer is completed or when a discontinuous path is shaped. In this case, the flow path 65 is closed by the valve body 73 of the opening and closing mechanism 70 and the discharge of the shaping material MM from the discharge port 62 is stopped. After the control unit 101 changes the position of the nozzle 61, the valve body 73 of the opening and closing mechanism 70 opens the flow path 65 to restart stacking the shaping material MM from a changed position of the nozzle 61. According to the three-dimensional shaping device 100, a stacking position of the shaping material MM by the nozzle 61 can be easily controlled by the opening and closing mechanism 70.

Figure 5:
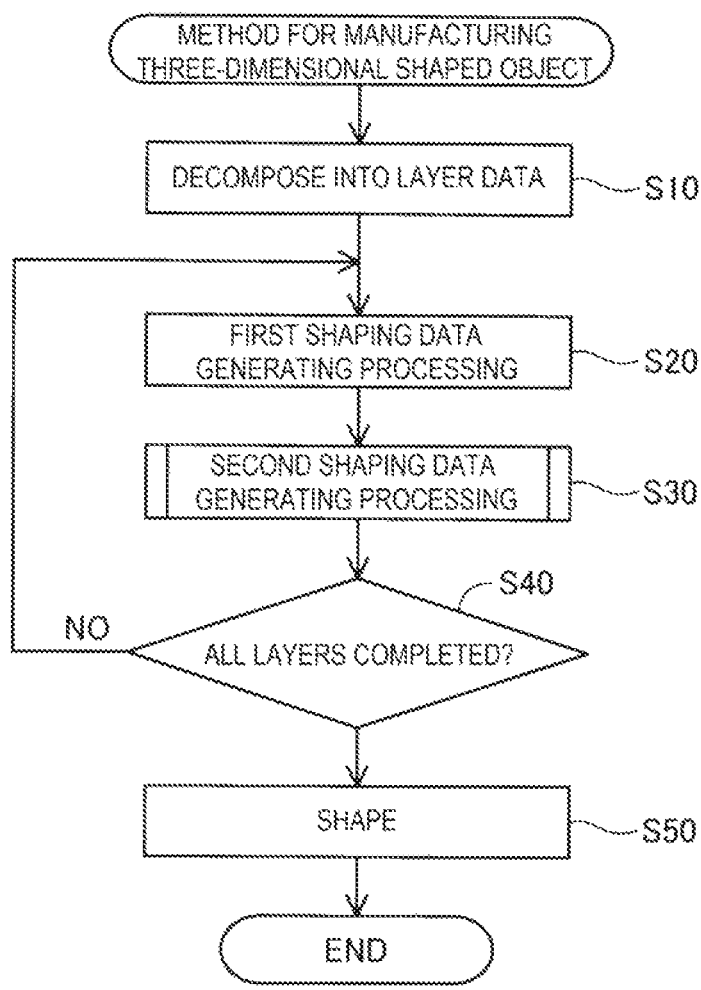
FIG. 5 is a process diagram showing a method for manufacturing a three-dimensional shaped object.

FIG. 5 is a process diagram showing a method for manufacturing a three-dimensional shaped object. First, in step S10, the data generation unit 102 analyzes three-dimensional CAD data that is the shaping data of the three-dimensional shaped object and that is input from the outside, and generates layer data obtained by slicing the three-dimensional shaped object into a plurality of layers along an XY plane. The layer data is data indicating an outer shell of the three-dimensional shaped object in the XY plane.

In step S20, the data generation unit 102 executes a first shaping data generating processing for generating the first shaping data. As described above, the first shaping data includes the information on the first discharge path forming the outer shell shape of the three-dimensional shaped object, and information for specifying the line width of the first discharge path. The first discharge path is a polygonal path in contact with the inner side of the outer shell of the three-dimensional shaped object indicated by the layer data. In the present embodiment, the line width of the first discharge path is set to the same line width for all sides of the polygon indicated by the first discharge path. In the present embodiment, a basic line width is set as the line width of the first discharge path. The basic line width is a predetermined line width, and is, for example, equal to a diameter of the discharge port 62. The data generation unit 102 may configure the first discharge path not only for an inner side circumference of the outer shell of the three-dimensional shaped object but also for two or more inner side circumferences. The number of circumferences of the first discharge path can be set optionally.

In step S30, the data generation unit 102 executes a second shaping data generating processing for generating the second shaping data. As described above, the second shaping data includes the information on the second discharge path that fills the infill area, and the information for specifying a line width of the second discharge path. The infill area is the inner side portion of the outer shell shape indicated by the above first discharge path. A specific method for generating the second shaping data will be described later.

In step S40, the data generation unit 102 determines whether the above processing is completed for all layer data. If the processing is not completed for all layer data, the data generation unit 102 repeats the processing of step S20 and step S30 for subsequent layer data.

When the generation of the first shaping data and the second shaping data is completed for all the layer data, in step S50, the control unit 101 controls the shaping unit 110 and the moving mechanism 230 to shape a three-dimensional shaped object according to the first shaping data and the second shaping data of each layer generated by the previous processing. Specifically, for a first layer positioned in a lowermost layer, the control unit 101 shapes the outer shell shape by using the first shaping data of the layer, and then performs shaping of the infill area using the second shaping data of the layer. Then, the nozzle 61 is moved in the +Z direction relative to the stage 210 by one layer, and for a second layer, the outer shell shape is shaped by using the first shaping data of the layer, and then the infill area is shaped using the second shaping data of the layer. Thus, the control unit 101 sequentially shapes the outer shell shape and the infill area for all the layers. The three-dimensional shaped object is manufactured by the series of processing described above.

Figure 6:
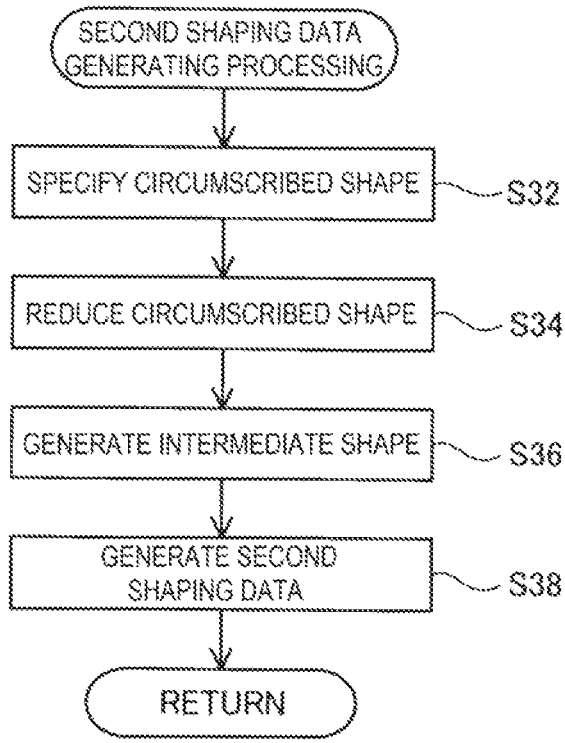
FIG. 6 is a flowchart of a second shaping data generating processing.

FIG. 6 is a flowchart of the second shaping data generating processing. First, in step S32, the data generation unit 102 specifies a rectangular shape circumscribing the infill area. Hereinafter, the rectangular shape circumscribing the infill area is referred to as a "circumscribed shape".

Figure 7:
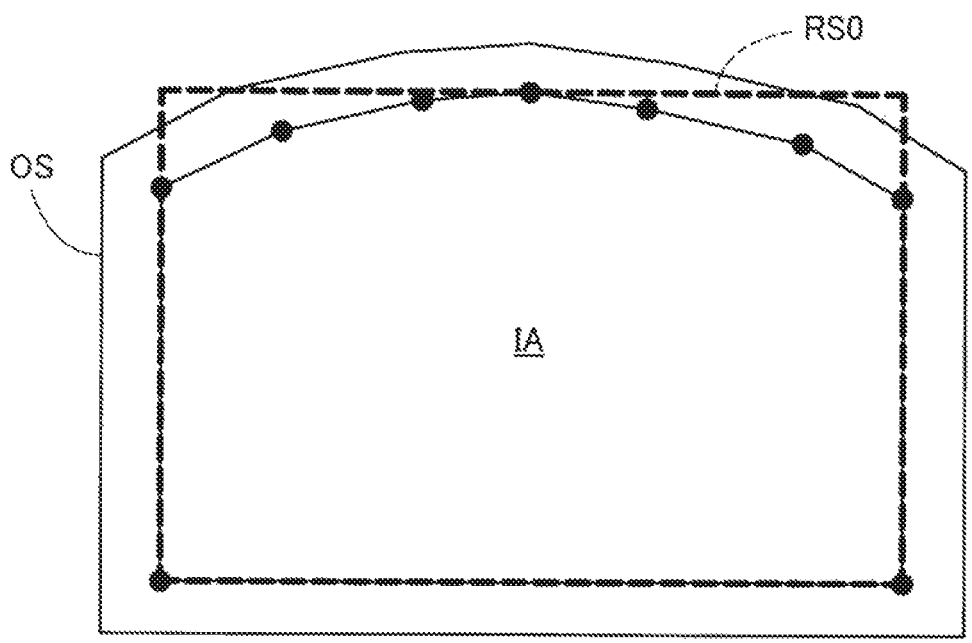
FIG. 7 shows an example of a circumscribed shape.

FIG. 7 shows an example of a circumscribed shape RSO. FIG. 7 shows a substantially rectangular outer shell shape OS in which one side in four sides protrudes outward in a fan shape, and an infill area IA which is an inner side portion of the outer shell shape OS. A shape of an outer circumference of the infill area IA is a polygon. In FIG. 7, the circumscribed shape RSO circumscribing the infill area IA is indicated by a broken line.

In step S34 shown in FIG. 6, the data generation unit 102 obtains a rectangular shape at an innermost circumference by reducing the circumscribed shape RSO specified in step S32 in a stepwise manner, and specifies a rectangular shape which is the rectangular shape at the innermost circumference as a shape forming a central area of the infill area IA.

Figure 8:
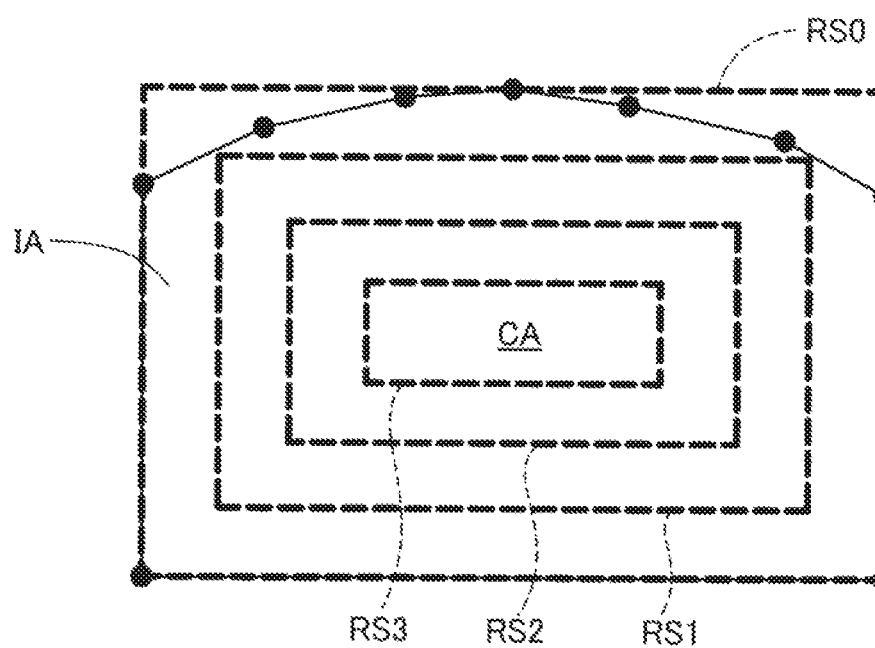
FIG. 8 is a diagram showing a state where the circumscribed shape is reduced in a stepwise manner and a central area.

FIG. 8 is a diagram showing a state where the circumscribed shape RSO is reduced in a stepwise manner and a central area CA. In the example shown in FIG. 8, by reducing the circumscribed shape RSO by three steps, two intermediate rectangular shapes RS1 and RS2 and a rectangular shape RS3 forming the central area CA are specified. An interval at which the reduction is performed in a stepwise manner may be, for example, a range of line widths configured to be shaped by the discharge unit 60, and a value obtained by dividing a length of a short side of the circumscribed shape RSO by an even number by which the length of the short side is dividable. The central area CA is a part of the infill area IA, and is an area having a size in which a gap does not occur in a center when the central area CA is shaped.

In step S36 shown in FIG. 6, the data generation unit 102 generates an intermediate shape. The intermediate shape is a shape of the discharge path from an outermost circumference of the infill area IA to the central area CA.

Figure 9:
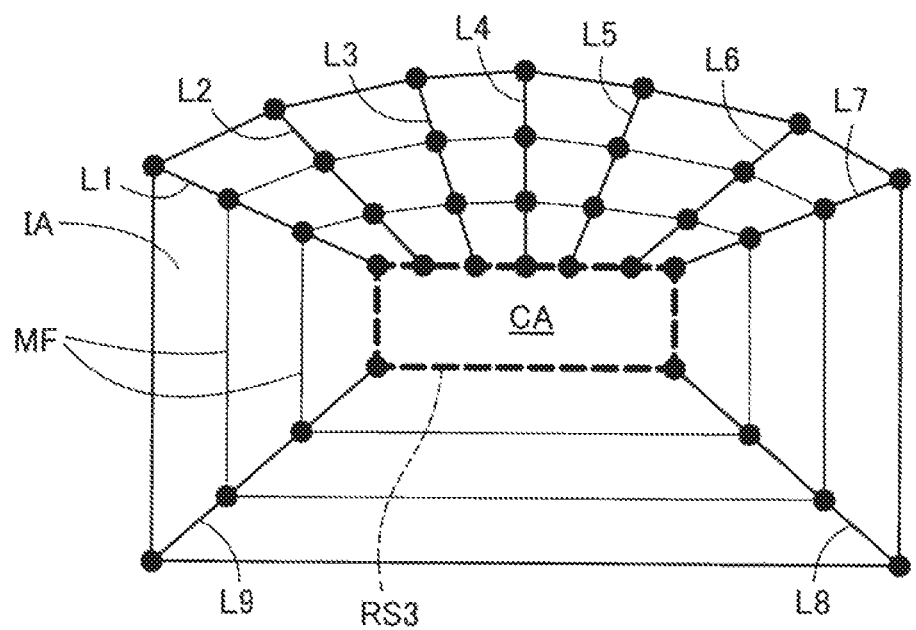
FIG. 9 is a diagram showing a method for generating an intermediate shape.

FIG. 9 is a diagram showing a method for generating the intermediate shape. First, the data generation unit 102 obtains straight lines L1 to L9 from vertices of the polygon indicating the outermost circumference of the infill area IA to the rectangular shape RS3 forming the central area CA. More specifically, the data generation unit 102 specifies, at sides of the rectangular shape RS3 forming the central area CA, corresponding points corresponding to the vertices of the polygon indicating the outermost circumference of the infill area IA, and obtains straight lines passing through the corresponding points and the respective vertices of the polygon, thereby obtaining the straight lines L1 to L9 from the vertices of the polygon indicating the outermost circumference of the infill area IA to the rectangular shape RS3 forming the central area CA. After obtaining the straight lines L1 to L9 in this way, the data generation unit 102 specifies coordinates of a number corresponding to the number of steps by which the circumscribed shape RSO is reduced in step S34 at equal intervals on the respective straight lines L1 to L9. Then, an intermediate shape MF is generated by linking coordinates corresponding to the respective steps of the reduction on the straight lines L1 to L9. The intermediate shape MF includes a plurality of polygons whose size changes in a stepwise manner from a shape along the outermost circumference of the infill area IA to a shape of the central area CA of the infill area IA.

In step S38 shown in FIG. 6, the data generation unit 102 generates the second shaping data based on the intermediate shape MF generated in the above step S36. Specifically, the data generation unit 102 records, as the second discharge path, a path along the plurality of polygons whose size changes in a stepwise manner from the shape along the outermost circumference of the infill area IA to the shape of the central area CA of the infill area IA in the second shaping data.

Figure 10:
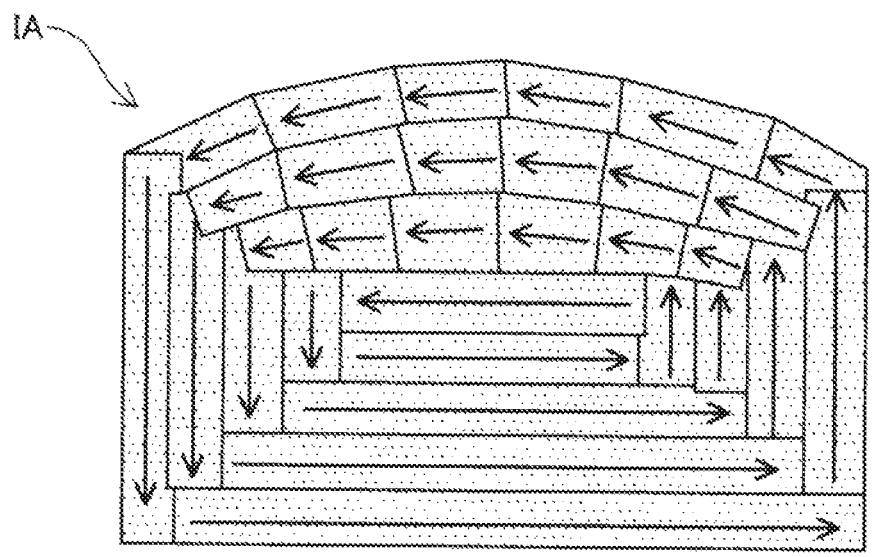
FIG. 10 is a diagram showing a second discharge path.

FIG. 10 is a diagram showing the second discharge path. The arrows shown in FIG. 10 schematically indicate a path forming the second discharge path. In the present embodiment, the data generation unit 102 sets a line width for forming the sides of the polygon according to an interval between facing sides in adjacent polygons among the plurality of polygons included in the intermediate shape, thereby recording information for specifying the line width of the second discharge path in the second shaping data. Specifically, the data generation unit 102 sets the line width to be larger than a reference line width if a distance between facing sides in the adjacent polygons is larger than the reference line width, and sets the line width to be smaller than the reference line width if the distance between the facing sides in the adjacent polygons is smaller than the reference line width. The number of steps for a size of the line width is preferably two or more steps including the reference line width, and more preferably three or more steps. The data generation unit 102 may change the reference line width with no step according to the interval between the facing sides in the adjacent polygons.

According to the method for manufacturing a three-dimensional shaped object of the present embodiment described above, as a path for filling the infill area IA that is an inner side portion of the outer shell shape of the three-dimensional shaped object, a path indicating a plurality of polygons whose size changes in a stepwise manner from the shape along the outermost circumference of the infill area IA to the shape of the central area CA of the infill area IA is generated. Therefore, it is possible to generate one path as a whole so that a void does not occur. As a result, strength of the three-dimensional shaped object can be improved.

In the present embodiment, the central area CA included in the infill area IA has a rectangular shape. Therefore, a path in which a gap is less likely to occur can be generated.

In the present embodiment, the line width for forming the side of the polygon is set according to the interval between the facing sides in the adjacent polygons among the plurality of polygons forming the second discharge path. Therefore, a path in which a gap is less likely to occur can be generated.

In the present embodiment, the central area CA is set by reducing the rectangular shape circumscribing the infill area IA in a stepwise manner, and the second shaping data from the polygon indicating the outermost circumference of the infill area IA to the central area CA is generated. Therefore, the second shaping data can be efficiently generated by a simple processing.

Figure 11:
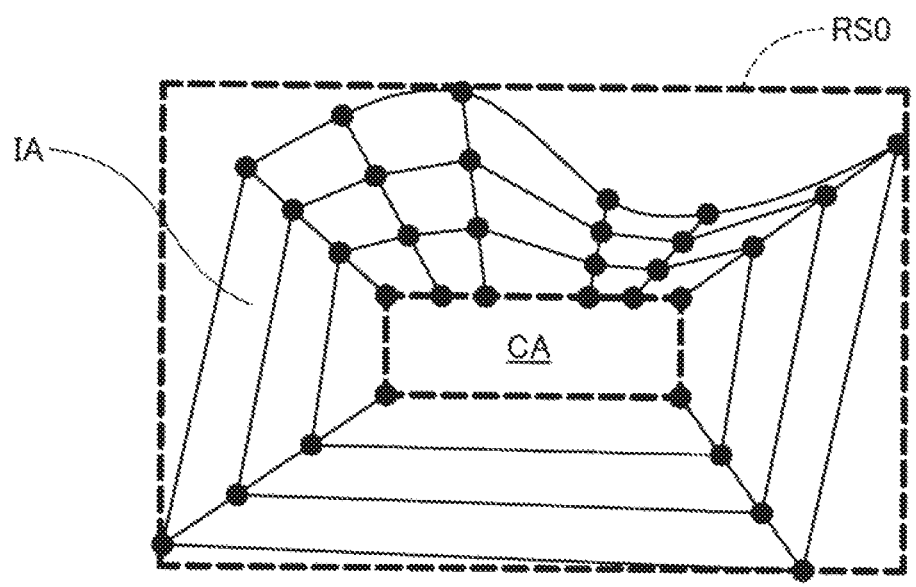
FIG. 11 is a diagram showing a three-dimensional shaped object with another shape.
Figure 12:
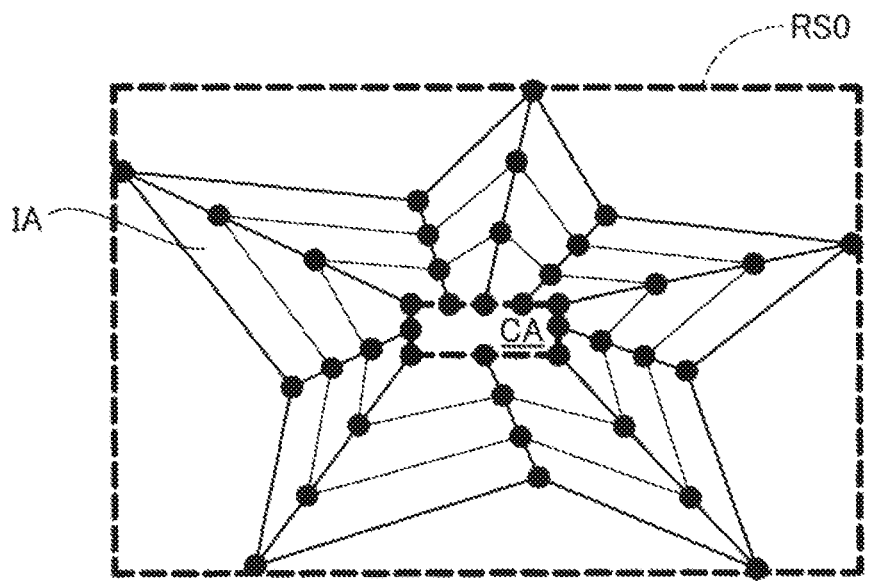
FIG. 12 is a diagram showing a three-dimensional shaped object with another shape.

In the present embodiment, as shown in FIG. 7, path data for filling an infill area of a substantially rectangular shape in which one side in four sides protrudes outward in a fan shape is generated. However, the shape to be generated as the path data is not limited to such a shape. Even if the shape is complicated, a path indicating a plurality of polygons whose size changes in a stepwise manner from a rectangular shape circumscribing the shape to the shape of the central area can be generated, and path data for filling the infill area can be generated for various shapes as shown in FIGS. 11 and 12 as long as the line width can be set without a gap being formed between the polygons.

B. Second Embodiment

Figure 13:
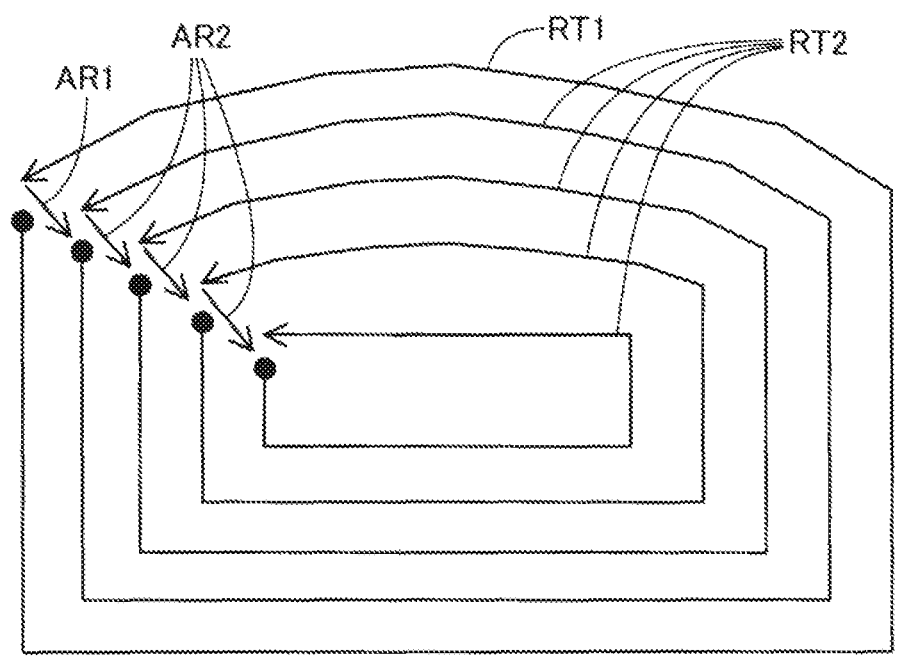
FIG. 13 is a diagram showing a first discharge path and a second discharge path generated in a second embodiment.

FIG. 13 is a diagram showing a first discharge path RT1 and a second discharge path RT2 generated in the second embodiment. A device configuration of the three-dimensional shaping device 100 in the second embodiment is the same as the configuration in the first embodiment. Therefore, a description of the three-dimensional shaping device 100 is omitted.

In the first embodiment as described above, the first discharge path forming the outer shell shape of the three-dimensional shaped object and the second discharge path filling the infill area are independent paths. Therefore, these paths are formed separately from each other. On the other hand, in the second embodiment, as shown in FIG. 13, by forming the first discharge path RT1 and the second discharge path RT2 as a continuous path, the first discharge path RT1 and the second discharge path RT2 are continuously shaped. Specifically, the data generation unit 102 sets, in step S36 of the second shaping data generating processing shown in FIG. 6, a start point of the second discharge path RT2 to a position near an end point of the first discharge path RT1, and adds a first link path AR1 linking the points, as shown in FIG. 13. Thus, this makes it possible to continuously form the first discharge path RT1 and the second discharge path RT2 without stopping the discharge of the shaping material from the nozzle 61. As a result, the three-dimensional shaped object can be efficiently manufactured.

In the first embodiment, the second discharge path forming the infill area is indicated by a plurality of independent polygons, each of which is independently shaped. However, in the second embodiment, a plurality of polygons included in the second discharge path is indicated by a continuous path. Specifically, the data generation unit 102 sets, after generating the intermediate shape for filling the infill area in step S36 of FIG. 6, a start point and an end point near each other for the plurality of polygons included in the intermediate shape, and adds a second link path AR2 linking the points, as shown in FIG. 13. Thus, the plurality of polygons can be indicated by a continuous path. If the plurality of polygons is indicated by a continuous path, the infill area can be shaped in the same manner as a single stroke without stopping the discharge of the shaping material from the nozzle 61, so that the three-dimensional shaped object can be efficiently manufactured.

In the second embodiment, the first discharge path RT1 and the second discharge path RT2 are continuous, and the plurality of polygons included in the second discharge path is also continuous. On the other hand, the first discharge path RT1 and the second discharge path RT2 may be continuous, and the plurality of polygons included in the second discharge path may not be continuous. In addition, the first discharge path RT1 and the second discharge path RT2 may not be continuous, and the plurality of polygons included in the second discharge path may be continuous.

C. Other Embodiments (C-1) In the embodiments described above, the shaping unit 110 plasticizes a material by the flat screw 40. On the other hand, the shaping unit 110 may plasticize the material by, for example, rotating a spiral in-line screw. The shaping unit 110 may adopt a head used in a fused deposition modeling (FDM).

(C-2) In the embodiments described above, the opening and closing mechanism 70 may be implemented by a mechanism using a plunger in which a piston protrudes into the flow path 65 and closes the flow path 65, or a mechanism using a shutter that moves in a direction intersecting the flow path 65 and closes the flow path 65. The opening and closing mechanism 70 may be implemented by combining two or more out of the butterfly valve in the embodiments described above, the above shutter mechanism, and the plunger mechanism. The discharge amount of the shaping material may be controlled by controlling a rotation speed of the flat screw 40 instead of the opening and closing mechanism 70.

(C-3) In the embodiments described above, a shape of the central area CA included in the infill area IA is rectangular. On the other hand, the shape of the central area CA is not limited to rectangle but may be another shape. For example, the shape of the central area CA may be a parallelogram, a square, or a trapezoid. The shape of the central area CA is preferably a shape in which at least one pair of facing sides are parallel to each other.

(C-4) In the embodiments described above, the line width of the plurality of polygons forming the second discharge path is set according to the interval between the facing sides. On the other hand, the line widths of the plurality of polygons forming the second discharge path may all be constant. In such a configuration, a small gap may be formed between the facing sides, but a large gap does not concentrate at one location. Since small gaps are dispersed throughout the infill area, the possibility of filling the gap by the shaping material around the gap is high. Therefore, even if the line width is not set for each side, it is possible to substantially prevent the occurrence of a gap in the three-dimensional shaped object, and it is possible to secure the strength of the three-dimensional shaped object.

(C-5) A method for generating an intermediate shape in the above embodiments is not limited to the above description, and any method can be applied. For example, it is not essential to specify the circumscribed shape circumscribing an outer shape of the infill area, and by applying a well-known morphing technique, the intermediate shape may be generated by generating a plurality of polygons whose shape and size change in a stepwise manner from the outer shape of the infill area to the shape of the central area.

(C-6) In the embodiments described above, the ABS resin material in a pellet form is used as a raw material supplied to the material supply unit 20. On the other hand, the three-dimensional shaping device 100 can use various materials such as a thermoplastic material, a metal material, and a ceramic material as main materials to shape the three-dimensional shaped object. Here, the "main material" means a central material for forming a shape of the three-dimensional shaped object, and a material occupying a content of 50% by weight or more in the three-dimensional shaped object. The above shaping materials include those in which main materials are melted alone, and those in which some of the components contained together with the main materials are melted to form a paste.

When the thermoplastic material is used as the main material, the shaping material is generated by plasticizing the material in the shaping material generation unit 30. The "plasticization" means that a thermoplastic material is heated and melted.

For example, the following thermoplastic resin materials can be used as the thermoplastic material.
Example of Thermoplastic Resin Material General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone The thermoplastic material may contain pigments, metals, ceramics, and an additive such as a wax, a flame retardant, an antioxidant, and a heat stabilizer. The thermoplastic material is plasticized by the rotation of the flat screw 40 and the heating with the heater 58 in the shaping material generation unit 30, and is converted into a melted state. The shaping material generated by melting the thermoplastic material is cured by a decrease in temperature after being discharged from the nozzle 61.

It is desirable that the thermoplastic material is emitted from the nozzle 61 in a state of being heated at a temperature equal to or higher than a glass transition point of the thermoplastic material and being completely melted. For example, a glass transition point of the ABS resin is about 120° C., and it is desirable that the ABS resin is emitted from the nozzle 61 at about 200° C. In order to emit the shaping material in such a high temperature state, a heater may be provided around the nozzle 61.

The following metal material, for example, may be used as the main material in the three-dimensional shaping device 100 instead of the above thermoplastic material. In this case, it is desirable that a component to be melted at the time of forming the shaping material is mixed with a powder material obtained by converting the following metal material into powder, and then the mixture is charged into the shaping material generation unit 30 as a raw material.
Example of Metal Material A single metal such as magnesium (Mg), iron (Fe), cobalt (Co), chromium (Cr), aluminum (Al), titanium (Ti), copper (Cu), and nickel (Ni), or an alloy containing one or more of these metals
Example of Alloy Maraging steel, stainless steel, cobalt chromium molybdenum, titanium alloy, nickel alloy, aluminum alloy, cobalt alloy, cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When the above metal material or ceramic material is used as the main material, the shaping material disposed on the stage 210 may be cured by, for example, sintering with laser irradiation or warm air.

A powder material of the metal material or the ceramic material charged into the material supply unit 20 as a raw material may be a mixed material obtained by mixing a plurality of types of powder including powder of a single metal or powder of an alloy and powder of a ceramic material. The powder material of the metal material or the ceramic material may be coated with, for example, the thermoplastic resin shown above or another thermoplastic resin. In this case, the thermoplastic resin may be melted in the shaping material generation unit 30 to exhibit flowability.

The following solvents, for example, may be added to the powder material of the metal material or the ceramic material charged into the material supply unit 20 as a raw material. The solvent can be used alone or in combination of two or more selected from the following.
Example of Solvent Water, (poly)alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates such as tetrabutylammonium acetates and ionic liquids such as butyl carbitol acetate In addition, for example, the following binders can be added to the powder material of the metal material or the ceramic material charged into the material supply unit 20 as a raw material.
Example of Binder Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins D. Other Aspects The present disclosure is not limited to the embodiments described above, and may be implemented by various configurations without departing from the scope of the present disclosure. For example, in order to solve some or all of problems described above, or to achieve some or all of effects described above, technical characteristics in the embodiments corresponding to technical characteristics in aspects described below can be replaced or combined as appropriate. If the technical characteristics are not described as essential in the description, they can be deleted as appropriate.

(1) According to a first aspect of the present disclosure, a method for manufacturing a three-dimensional shaped object in which a three-dimensional shaped object is manufactured by discharging a shaping material from a discharge unit is provided. The method for manufacturing a three-dimensional shaped object includes: (A) a step of generating first shaping data including information on a first discharge path for forming an outer shell shape of the three-dimensional shaped object, and information for specifying a line width of the first discharge path; (B) a step of generating second shaping data including information on a second discharge path for filling an infill area that is an inner side portion of the outer shell shape, and information for specifying a line width of the second discharge path; and (C) a step of shaping the three-dimensional shaped object according to the first shaping data and the second shaping data, in which in step (B), a path indicating a plurality of polygons whose sizes change in a stepwise manner from a shape along an outermost circumference of the infill area to a shape of a central area of the infill area is generated as the second discharge path.

According to such an aspect, as the second discharge path for filling the infill area that is the inner side portion of the outer shell shape of the three-dimensional shaped object, the path indicating the plurality of polygons whose sizes change in a stepwise manner from the shape along the outermost circumference of the infill area to the shape of the central area of the infill area is generated. Therefore, it is possible to generate one path as a whole so that a void does not occur.

(2) In the method for manufacturing a three-dimensional shaped object according to the above aspect, the shape of the central area may be rectangular. According to such an aspect, a path in which a gap is less likely to occur can be generated.

(3) In the method for manufacturing a three-dimensional shaped object according to the above aspect, in step (B), a line width for forming a side of the polygon may be set according to an interval between facing sides in adjacent polygons among the plurality of polygons. According to such an aspect, a path in which a gap is less likely to occur can be generated.

(4) In the method for manufacturing a three-dimensional shaped object according to the above aspect, the information for specifying the line width may be information indicating at least one of a moving speed of the discharge unit and a discharge amount of the shaping material. According to such an aspect, the line width can be changed by adjusting the moving speed of the discharge unit and the discharge amount of the shaping material.

(5) In the method for manufacturing a three-dimensional shaped object according to the above aspect, in step (B), a continuous path indicating the plurality of polygons may be generated as the second discharge path. According to such an aspect, the three-dimensional shaped object can be efficiently manufactured.

(6) In the method for manufacturing a three-dimensional shaped object according to the above aspect, in step (B), the second discharge path may be continuous with the first discharge path. According to such an aspect, the three-dimensional shaped object can be efficiently manufactured.

(7) In the method for manufacturing a three-dimensional shaped object according to the above aspect, in step (B), a rectangular shape at an innermost circumference may be obtained by reducing a rectangular shape circumscribing the infill area in a stepwise manner, and the rectangular shape at the innermost circumference may be specified as a shape forming the central area, straight lines from respective vertexes of a polygon indicating the outermost circumference of the infill area to the shape forming the central area may be obtained, and coordinates of the number corresponding to the number of steps in the reducing may be specified on the respective straight lines, and paths indicating the plurality of polygons may be generated by linking coordinates on the respective straight lines corresponding to respective steps in the reducing. According to such an aspect, the second shaping data can be efficiently generated.

The present disclosure is not limited to the method for manufacturing a three-dimensional shaped object described above, and can be implemented by various aspects such as a three-dimensional shaping device, a three-dimensional shaping system, and a method for controlling a three-dimensional shaping device.

What is claimed is:

1. A method for manufacturing a three-dimensional shaped object in which a three-dimensional shaped object is manufactured based on the layer data by discharging a shaping material from a discharge unit, the method for causing a processor to execute a program stored in a memory, the method comprising executing on the processor the steps of:
   (A) a step of generating first shaping data based on the layer data, the first shaping data including information of a first discharge path for forming an outer shell shape of the three-dimensional shaped object, and information for specifying a first line width of the first discharge path;
   (B) a step of generating second shaping data based on the layer data, the second shaping data including information of a second discharge path for filling an infill area that is an inner side portion of the outer shell shape, and information for specifying a corresponding one of a plurality of second line widths of the second discharge path; and
   (C) a step of shaping the three-dimensional shaped object according to the first shaping data and the second shaping data,
   wherein the step (B) includes:
      (D) a step of generating a circumscribed rectangle that circumscribes an outer circumference of the infill area, the outer circumference of the infill area being an outer most polygon;
      (E) a step of generating a plurality of rectangles, each of the plurality of rectangles having a similar reduced area with respect to the circumscribed rectangle by different reduction rates, an inner rectangle of the plurality of rectangles being completely enclosed by an outer rectangle of the plurality of rectangles, a distance between a periphery of the inner rectangle and a periphery of the outer rectangle being less than a maximum line width;
      (F) a step of identifying a plurality of points on a periphery of an inner most rectangle of the plurality of rectangles, the plurality of points corresponding to vertices of the outer most polygon, (G) a step of drawing a plurality of linear lines, the plurality of linear lines connecting between the vertices of the outer most polygon and the plurality of points on the periphery of the inner most rectangle;

(H) a step of equally dividing each of the plurality of linear lines by a number of the plurality of rectangles to identify divided points on each of the plurality of linear lines;

(I) a step of connecting corresponding divided points of the plurality of linear lines to form a plurality of polygons, at least on vertex of one polygon of the plurality of polygons being at least one vertex of one rectangle of the plurality of rectangles;

(J) a step of identifying a plurality of areas, the plurality of areas having peripheries of the plurality of polygons;

(K) a step of comparing a width of each of the plurality of areas defined by the peripheries of the plurality of polygons with a reference line width to determine the corresponding one of the plurality of second line widths for each of the plurality of areas, the second discharge path is formed by continuously connecting the plurality of areas from an outer most area of the plurality of areas toward an inner most area of the plurality of areas, and the inner most area is the inner most rectangle, and two adjacent polygons among the plurality of polygons are different in shape and size from each other.

2. The method for manufacturing a three-dimensional shaped object according to claim 1, wherein a central area of the infill area is the inner most rectangle of the plurality of rectangles, and the inner most rectangle is an inner most polygon of the plurality of polygons.

3. The method for manufacturing a three-dimensional shaped object according to claim 1, wherein each of the information for specifying the first line width and the information for specifying the corresponding one of the plurality of second line widths indicates at least one of a moving speed of the discharge unit and a discharge amount of the shaping material.

4. The method for manufacturing a three-dimensional shaped object according to claim 1, wherein the second discharge path is continuous with the first discharge path.

* * * * *